US011685285B2

(12) United States Patent
Igata et al.

(10) Patent No.: US 11,685,285 B2
(45) Date of Patent: Jun. 27, 2023

(54) REPLACEMENT FEE SETTING APPARATUS, METHOD AND SYSTEM

(71) Applicants: TOYOTA JIDOSHA KABUSHIKI KAISHA, Toyota (JP); DENSO CORPORATION, Kariya (JP)

(72) Inventors: Hiroshi Igata, Yokohama (JP); Shin Sakurada, Toyota (JP); Kuniaki Jinnai, Nagoya (JP); Motoyoshi Hatta, Anjo (JP); Shota Hirose, Toyoake (JP)

(73) Assignees: TOYOTA JIDOSHA KABUSHIKI KAISHA, Toyota (JP); DENSO CORPORATION, Kariya (JP)

( * ) Notice: Subject to any disclaimer, the term of this patent is extended or adjusted under 35 U.S.C. 154(b) by 394 days.

(21) Appl. No.: 16/196,002

(22) Filed: Nov. 20, 2018

(65) Prior Publication Data
US 2019/0152328 A1 May 23, 2019

(30) Foreign Application Priority Data
Nov. 21, 2017 (JP) .................. 2017-223554

(51) Int. Cl.
*B60L 58/12* (2019.01)
*G06Q 30/02* (2023.01)
(Continued)

(52) U.S. Cl.
CPC .............. *B60L 53/665* (2019.02); *B60L 53/80* (2019.02); *B60L 58/12* (2019.02); *G06Q 30/0283* (2013.01)

(58) Field of Classification Search
CPC ........ B60L 53/665; B60L 53/80; B60L 58/12; B60L 50/66; G06Q 30/0283; G06Q 30/02;
(Continued)

(56) References Cited

U.S. PATENT DOCUMENTS

2001/0035737 A1* 11/2001 Nakanishi .......... G01R 31/3842
320/122
2003/0224241 A1* 12/2003 Takada ................ H01M 10/425
429/52
(Continued)

FOREIGN PATENT DOCUMENTS

JP 2010-097388 A 4/2010
JP 2010-172142 A 8/2010
(Continued)

OTHER PUBLICATIONS

Sears.com, DieHard Automotive Battery 1, Dec. 27, 2013 (Year: 2013).*

(Continued)

*Primary Examiner* — Resha Desai
*Assistant Examiner* — Michelle E Carey
(74) *Attorney, Agent, or Firm* — Hunton Andrews Kurth LLP

(57) ABSTRACT

A management server performs a process including: when there is a request to partially replace a battery, obtaining a usage history of the battery; obtaining each cell's full charge capacity; determining a cell having a smallest full charge capacity as a cell to be replaced; calculating an average value of the full charge capacities of the plurality of cells excluding the cell to be replaced; extracting a selectable cell from inventory information; selecting a replacement cell; setting a replacement fee corresponding to partial replacement; and when entire replacement is requested, setting a replacement fee corresponding to entire replacement.

4 Claims, 5 Drawing Sheets

(51) Int. Cl.
B60L 53/66 (2019.01)
G06Q 30/0283 (2023.01)
B60L 53/80 (2019.01)

(58) Field of Classification Search
CPC ............ G06Q 30/028; H01M 10/4207; H01M 2220/20; Y04S 30/14; Y02T 10/70; Y02T 90/167; H04W 4/24
See application file for complete search history.

(56) References Cited

U.S. PATENT DOCUMENTS

| | | | | |
|---|---|---|---|---|
| 2009/0198372 | A1* | 8/2009 | Hammerslag | H02J 7/00043 700/226 |
| 2010/0114800 | A1* | 5/2010 | Yasuda | B60L 53/80 705/412 |
| 2012/0091955 | A1* | 4/2012 | Gao | B60L 53/80 320/109 |
| 2012/0119749 | A1* | 5/2012 | Iida | H02J 7/0013 324/426 |
| 2012/0290234 | A1* | 11/2012 | Schaefer | B60L 58/12 702/63 |
| 2013/0030739 | A1* | 1/2013 | Takahashi | G01R 31/396 702/63 |
| 2017/0250548 | A1* | 8/2017 | Eo | H02J 7/0072 |
| 2017/0264110 | A1* | 9/2017 | Toya | H02J 7/0021 |
| 2018/0012197 | A1* | 1/2018 | Ricci | B60L 53/80 |
| 2018/0152026 | A1* | 5/2018 | Hwang | B60L 58/22 |
| 2019/0190303 | A1* | 6/2019 | Geng | H02J 7/00047 |

FOREIGN PATENT DOCUMENTS

| | | |
|---|---|---|
| JP | 2012505628 A | 3/2012 |
| WO | 2010042517 A1 | 4/2010 |
| WO | 2013018888 A1 | 2/2013 |

OTHER PUBLICATIONS

Sears.com, DieHard Automotive Battery 2, Dec. 27, 2013 (Year: 2013).*

Hints and Solutions to Look for a Pattern #6, University of Pennsylvania, Jun. 20, 2010.*

Aguirre et. al. Lifecycle Analysis Comparison of a Battery Electric Vehicle and a Conventional Gasoline Vehicle, University of California Los Angeles, Jun. 2012, https://www.ioes.ucla.edu/wp-content/uploads/ev-vs-gasoline-cars-practicum-final-report.pdf (Year: 2012).*

Murnane, Martin et. al., "A Closer Look at State of Charge (SOC) and State of Health (SOH) Estimation Techniques for Batteries", 2017, https://www.analog.com/media/en/technical-documentation/technical-articles/a-closer-look-at-state-of-charge-and-state-health-estimation-techniques.pdf (Year: 2017).*

Antonio Manenti et. al., A New Cell Balancing Architecture for Li-ion Battery Packs Based on Cell Redundancy, IFAC Proceedings Volumes, vol. 44, Issue 1, 2011, pp. 12150-12155, https://doi.org/10.3182/20110828-6-IT-1002.00280 (https://www.sciencedirect.com/science/article/pii/S1474667016455692) (Year: 2011).*

* cited by examiner

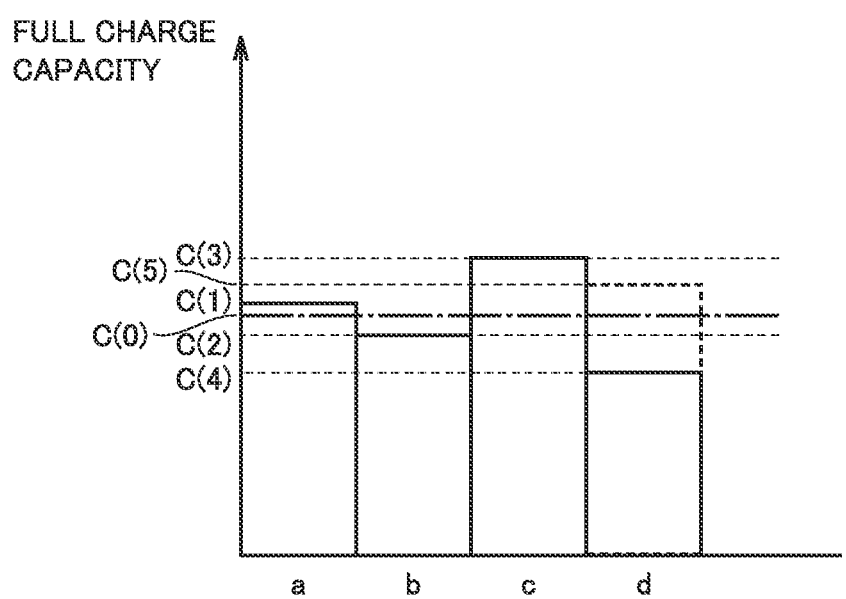

ABSTRACT# REPLACEMENT FEE SETTING APPARATUS, METHOD AND SYSTEM

This nonprovisional application is based on Japanese Patent Application No. 2017-223554 filed on Nov. 21, 2017 with the Japan Patent Office, the entire contents of which are hereby incorporated by reference.

BACKGROUND

Field

The present disclosure relates to setting a replacement fee for a power storage device mounted in an electric vehicle.

Description of the Background Art

Conventionally, there has been known a power storage device replacement system in which a power storage device such as a battery mounted in an electric vehicle is replaced and a replacement fee is collected. For example, Japanese Patent Laying-Open No. 2010-097388 discloses that a battery is leased and can be replaced with a replacement battery at a gasoline station or a similar location for replacement, and an electric meter attached to the replaced battery is used to settle an electricity bill corresponding to how much power has been used.

SUMMARY

In the replacement system as described above, however, it is assumed that the power storage device is entirely replaced, and there is no consideration for how a replacement fee is set for example when a power storage device is configured to be dividable and replaceable and is partially replaced. Furthermore, when a power storage device is partially replaced, a replacement component may be a reused secondhand item, and it is necessary to appropriately select which component of the power storage device is to be removed and what type of component is to be attached.

An object of the present disclosure is to provide a replacement fee setting apparatus, method and system such that when a power storage device having a divided configuration is partially replaced an appropriate replacement target is selected and an appropriate replacement fee is set.

According to one aspect of the present disclosure, a replacement fee setting apparatus is a replacement fee setting apparatus configured to set a replacement fee for a power storage device mounted in an electric vehicle. The power storage device includes a plurality of replaceable power storage elements. The present replacement fee setting apparatus comprises: a storage device configured to store information of a full charge capacity of each of the plurality of power storage elements and information of a full charge capacity of each of a plurality of stocked replacement power storage elements; and a fee setting device configured to set a lower replacement fee for partial replacement than for entire replacement. In the partial replacement a portion of the power storage device including at least one of the plurality of power storage elements is replaced. In the entire replacement the power storage device is replaced entirely. The fee setting device is configured to set, for the partial replacement, at least a first power storage element of the plurality of power storage elements as a power storage element to be replaced, the first power storage element having a smallest full charge capacity, and set a second power storage element of the plurality of stocked power storage elements as a power storage element to replace the power storage element to be replaced. The second power storage element has a full charge capacity between a maximum value and a minimum value of the full charge capacities of the plurality of power storage elements excluding the first power storage element.

In this way, for partial replacement, the first power storage element can be replaced with the second power storage element to substantially increase the range of the amount of power available in the power storage device and hence increase the electric vehicle's travelable distance. Further, for partial replacement, a replacement fee of a smaller amount is set than for entire replacement, which can motivate a user to select the partial replacement. Accordingly, an appropriate replacement fee for the partial replacement can be set. Furthermore, since the second power storage element has a full charge capacity between the maximum value and the minimum value of the full charge capacities of the plurality of power storage elements excluding the first power storage element, the partial replacement can suppress an otherwise increased variation between the full charge capacities of the plurality of power storage elements.

In an embodiment, the fee setting device is configured to set a lower replacement fee when the second power storage element has a smaller full charge capacity than when the second power storage element has a larger full charge capacity.

This can motivate a user to select the second power storage element having the smaller full charge capacity. Accordingly, an appropriate replacement fee for the partial replacement can be set.

According to another aspect of the present disclosure, a method is a method for setting a replacement fee for a power storage device mounted in an electric vehicle. The power storage device includes a plurality of replaceable power storage elements. The present replacement fee setting method comprises: storing information of a full charge capacity of each of the plurality of power storage elements and information of a full charge capacity of each of a plurality of stocked replacement power storage elements; setting a lower replacement fee for partial replacement than for entire replacement, in the partial replacement a portion of the power storage device including at least one of the plurality of power storage elements being replaced, in the entire replacement the power storage device being replaced entirely; setting, for the partial replacement, a first power storage element of the plurality of power storage elements as a power storage element to be replaced, the first power storage element having a smallest full charge capacity; and setting a second power storage element of the plurality of stocked power storage elements as a power storage element to replace the power storage element to be replaced. The second power storage element has a full charge capacity between a maximum value and a minimum value of the full charge capacities of the plurality of power storage elements excluding the first power storage element.

According to still another aspect of the present disclosure, a replacement fee setting system comprises: an electric vehicle having a power storage device mounted therein, the power storage device including a plurality of replaceable power storage elements; and a server configured to set a replacement fee for the power storage device. The server includes: a storage device configured to store information of a full charge capacity of each of a plurality of stocked replacement power storage elements and information of a full charge capacity of each of the plurality of power storage elements as obtained from the electric vehicle; and a fee setting device configured to set a lower replacement fee for partial replacement than for entire replacement. In the partial replacement a portion of the power storage device including at least one of the plurality of power storage elements is replaced. In the entire replacement the power storage device is replaced entirely. The fee setting device is configured to set, for the partial replacement, a first power storage element of the plurality of power storage elements as a power storage element to be replaced, the first power storage element having a smallest full charge capacity, and a second power storage element of the plurality of stocked power storage elements as a power storage element to replace the power storage element to be replaced. The second power storage element has a full charge capacity between a maximum value and a minimum value of the full charge capacities of the plurality of power storage elements excluding the first power storage element.

The foregoing and other objects, features, aspects and advantages of the present disclosure will become more apparent from the following detailed description of the present disclosure when taken in conjunction with the accompanying drawings.

BRIEF DESCRIPTION OF THE DRAWINGS

FIG. 5 is a diagram for illustrating an example of an operation performed to determine a cell to be replaced from a plurality of cells.

DESCRIPTION OF THE PREFERRED EMBODIMENTS

The present disclosure will now be described in embodiments hereinafter in detail with reference to the drawings. In the figures, identical or corresponding components are identically denoted and will not be described repeatedly.

<Configuration of Replacement Fee Setting System>

Figure 1:
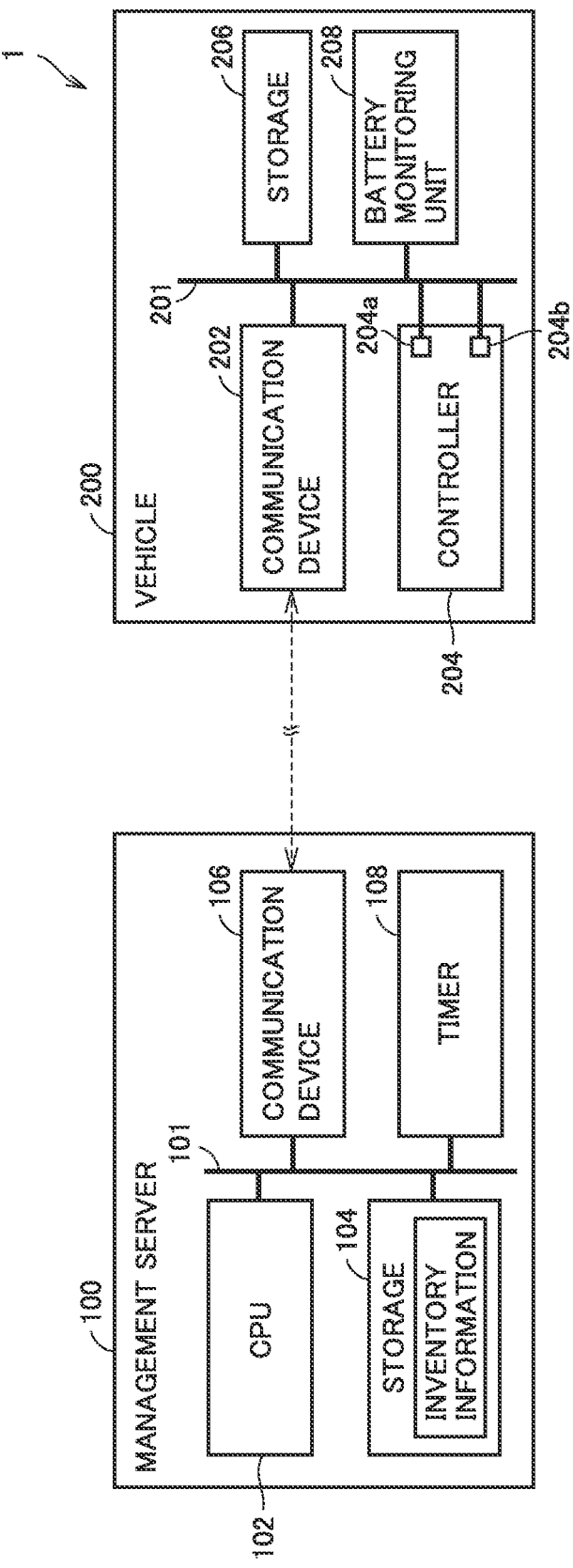
FIG. 1 is an overall configuration diagram of a replacement fee setting system according to the present embodiment.

FIG. 1 is an overall configuration diagram of a replacement fee setting system 1 according to the present embodiment. As shown in FIG. 1, replacement fee setting system 1 according to the present embodiment includes a management server 100, and a vehicle 200 which is an electric vehicle.

Management server 100 includes a CPU (Central Processing Unit) 102, a storage 104, and a communication device 106. Each component is communicatively connected by a communication bus 101. Management server 100 is installed, for example, in a prescribed location allowing replacement of a battery mounted in an electric vehicle.

CPU 102 is configured to execute prescribed computation processing based for example on information stored in storage 104, information received from vehicle 200 via communication device 106, and/or the like.

Storage 104 includes, for example, a memory such as a ROM (Read Only Memory) and a RAM (Random Access Memory), and a large-capacity storage device such as a hard disk or a solid state drive. Storage 104 stores, for example, information associating a battery 214 (see FIG. 2) mounted in vehicle 200 with a user (i.e., a user list).

Communication device 106 is configured to communicate with communication device 202 of vehicle 200. For example, communication device 106 and communication device 202 communicate information with each other through wireless communication. Communication device 106 and communication device 202 may communicate via a relay point (a wireless base station), a prescribed communication network (for example, the Internet), or the like, or may not communicate via a relay point, a prescribed communication network or the like.

The wireless communications may be done in a wireless communication system capable of transmitting and receiving signals via a relay point utilizing a wireless LAN (Local Area Network) represented by IEEE 802.11, a wireless communication standard for a mobile phone such as 2G, 3G, 4G, 5G, etc., and the like, or may be done in a wireless communication system capable of transmitting and receiving signals directly between communication device 106 and communication device 202 and for example utilizing a wireless communication standard such as Bluetooth (Registered trademark) or the like.

Vehicle 200 includes communication device 202, a controller 204, a storage 206, and a battery monitoring unit 208. Each component is communicatively connected by a communication bus 201.

For example, communication device 202 is configured to communicate with communication device 106 of management server 100. Communication device 106 and communication device 202 wirelessly communicate as has been described above, and accordingly, how they do so will not be described redundantly. Communication device 202 communicates with communication device 106 for example when vehicle 200 moves to a prescribed location allowing replacement and thus enters an area allowing communication device 202 to communicate with communication device 106 of management server 100.

Controller 204 includes, for example, a CPU 204a, a memory 204b (ROM and RAM), an input/output port for inputting and outputting various signals (not shown) and so forth. Controller 204 is configured to execute prescribed computation processing based on the information stored in memory 204b and storage 206, information received from management server 100 via communication device 202, and the like.

Storage 206 is a storage device that can store data of a larger size than memory 204b, and is, for example, a storage device composed of a nonvolatile memory, a hard disk, a solid state drive, or the like. Storage 206 for example stores a history of the SOC (State Of Charge) of battery 214 mounted in vehicle 200 (see FIG. 2), a history of battery 214's current, voltage and temperature, a history of voltage and temperature of each of a plurality of cells constituting battery 214 (see FIG. 3), a history of the full charge capacity of each of the plurality of cells, and the like.

Battery monitoring unit 208 detects a state of a battery 214 mounted in vehicle 200. Battery monitoring unit 208 detects, for example, battery 214's current, voltage and temperature. Further, battery monitoring unit 208 detects the voltage and temperature of each of the plurality of cells constituting battery 214. Note that battery monitoring unit 208 may detect the temperature of any one of the plurality of cells as the temperature of battery 214.

Battery monitoring unit 208 calculates an estimated value of an SOC of battery 214 by using for example the detected voltage, current and temperature of battery 214. The SOC may be estimated using a well-known technique, and it will not be described specifically. Note that the SOC may be estimated by controller 204 rather than battery monitoring unit 208.

Further, battery monitoring unit 208 estimates the full charge capacity of each of the plurality of cells from the history of the voltage, current and temperature of each of the plurality of cells. As a method of estimating the full charge capacity, for example, while it is conceivable to estimate a variation of an SOC corresponding to a prescribed amount of charge and estimate a full charge capacity from the estimated SOC variation, any well-known technique may be used and will not be described specifically. Battery monitoring unit 208 transmits signals indicating various detection results and various estimation results to controller 204. Controller 204 causes storage 206 to store a variety of information based on the signals received from battery monitoring unit 208.

Figure 2:
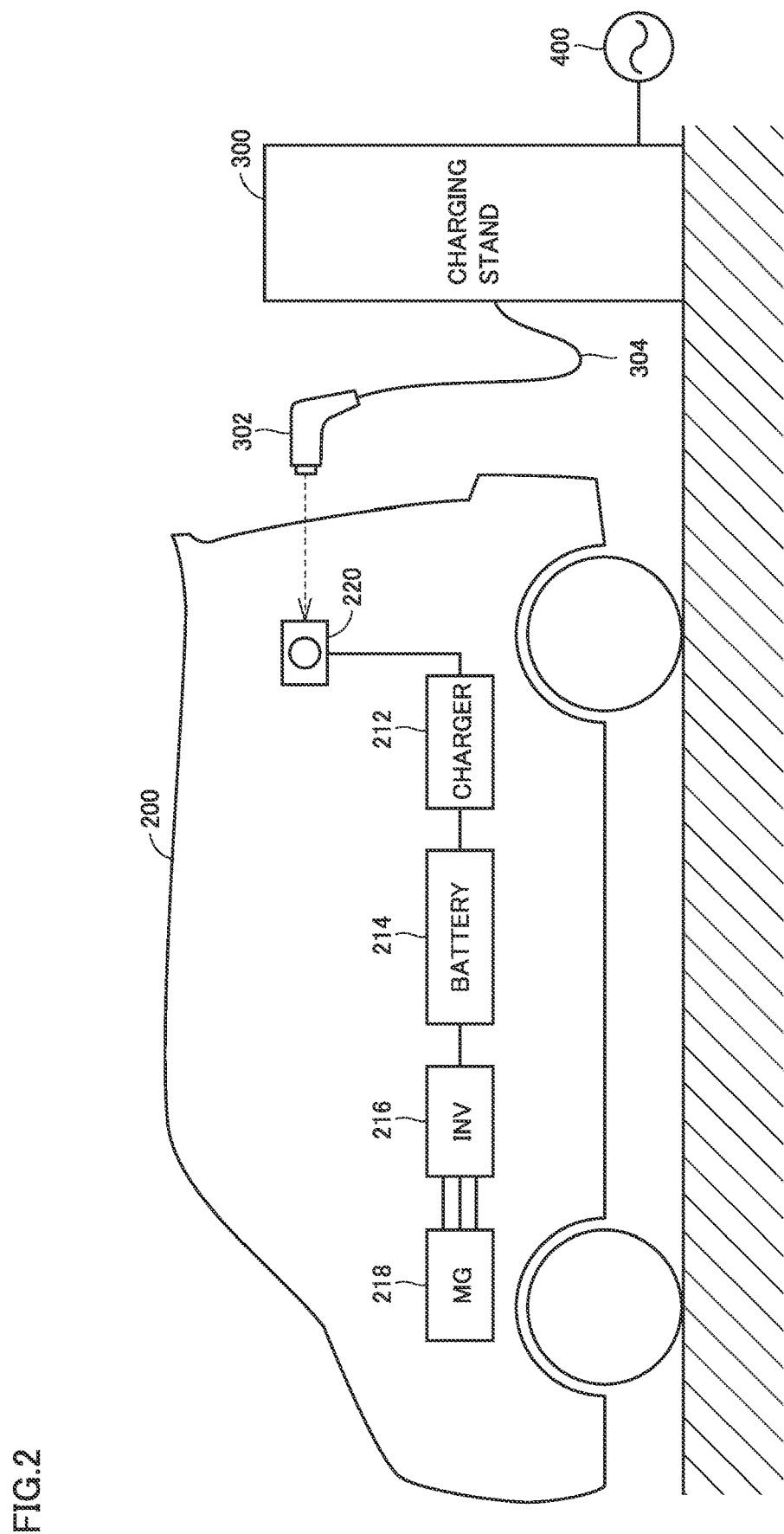
FIG. 2 is a diagram showing an example of a configuration of an electric vehicle.

Vehicle 200 is an electric vehicle using an electric motor as a driving power source. FIG. 2 is a diagram showing an example of a configuration of the electric vehicle.

As shown in FIG. 2, vehicle 200 further includes a charger 212, battery 214, an inverter 216, a motor generator 218, and an inlet 220.

When a charging stand 300 has a charging connector 302 attached to inlet 220, charger 212 charges battery 214 with power supplied from an external power supply 400.

Battery 214 is configured using, for example, a secondary battery such as a nickel metal hydride battery or a lithium ion battery. Battery 214 may be any power storage device composed of a plurality of dividable power storage elements and capable of storing power, and for example, a large-capacity capacitor may be used instead of battery 214.

Inverter 216 is a power conversion device which converts power between AC power and DC power. Inverter 216 may for example convert DC power of battery 214 into AC power and supplies it to motor generator 218. Further, inverter 216 may for example receive AC power (regenerative power) from motor generator 218, convert it into DC power, and supply it to battery 214 to electrically charge battery 214 therewith.

Motor generator 218 receives power supplied from inverter 216 and provides rotational force to a drive wheel 222. Drive wheel 222 is rotated by the rotational force provided by motor generator 218 to drive vehicle 200.

Inlet 220 is provided to vehicle 200 at an exterior portion of vehicle 200 together with a cover (not shown) such as a lid. Inlet 220 has a shape allowing charging connector 302 to be attached thereto. Inlet 220 and charging connector 302 both have contacts, respectively, incorporated therein. When charging connector 302 is attached to inlet 220, the contacts come into contact with each other, and inlet 220 and charging connector 302 are thus electrically connected together.

Charging stand 300 is installed outside vehicle 200 and connected to charging connector 302 via a charging cable 304. Charging stand 300 is electrically connected to a power supply 400, and when charging connector 302 is attached to inlet 220, the power of power supply 400 is supplied via charging stand 300, charging cable 304, and charging connector 302 to vehicle 200.

<Specific Configuration of Battery 214>

Figure 3:
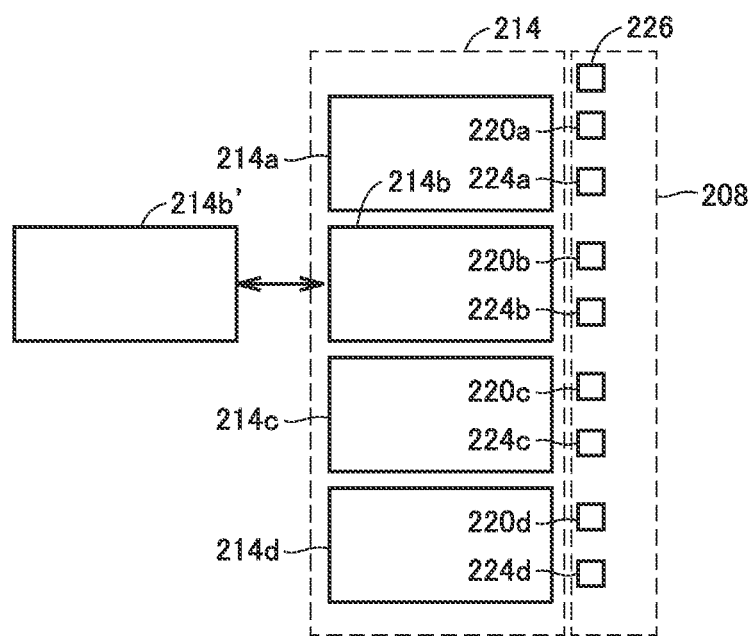
FIG. 3 shows an example of a configuration of a battery.

Battery 214 in the present embodiment includes a plurality of cells that are a plurality of replaceable power storage elements. FIG. 3 shows an example of a configuration of battery 214. As shown in FIG. 3, battery 214 is composed of four cells 214a, 214b, 214c, and 214d. Cells 214a to 214d are configured to be individually replaceable. For example, cell 214b can be replaced as follows: after cell 214b is removed, a cell 214b' having the same configuration as cell 214b is attached to a location at which cell 214b had been attached.

Battery monitoring unit 208 includes voltage sensors 220a, 220b, 220c, and 220d, temperature sensors 224a, 224b, 224c, and 224d, and a current sensor 226. Current sensor 226 senses a current flowing through battery 214.

Cell 214a is provided with voltage sensor 220a and temperature sensor 224a. Voltage sensor 220a senses a voltage Vb(1) of cell 214a. Temperature sensor 224a senses a temperature Tb(1) of cell 214a.

Cell 214b is provided with voltage sensor 220b and temperature sensor 224b. Voltage sensor 220b senses a voltage Vb(2) of cell 214b. Temperature sensor 224b senses a temperature Tb(2) of cell 214b.

Cell 214c is provided with voltage sensor 220c and temperature sensor 224c. Voltage sensor 220c senses a voltage Vb(3) of cell 214c. Temperature sensor 224c senses a temperature Tb(3) of cell 214c.

Cell 214d is provided with voltage sensor 220d and temperature sensor 224d. Voltage sensor 220d senses a voltage Vb(4) of cell 214d. Temperature sensor 224d senses a temperature Tb(4) of cell 214d.

Note that, for example, after cell 214b is replaced with cell 214b', voltage sensor 220b and temperature sensor 224b will be described as sensing the voltage and temperature of cell 214b'.

<Battery Replacement Service>

For example, a manner of utilization is considered in which battery 214 mounted in an electric vehicle is leased until a prescribed term (of one year or plural years) of a contract expires, and during that term, replacing battery 214 is allowed once or more. When a user selects such a manner of utilization, the user can replace battery 214 at a prescribed location by paying a replacement fee in addition to a prescribed rental fee paid whenever a prescribed period of time (for example of one month) elapses.

Thus replacing battery 214 may include replacing battery 214 entirely (hereinafter also referred to as "entire replacement") and partially replacing battery 214 when the battery is configured to be dividable and replaceable (hereinafter also referred to as "partial replacement"), and appropriately setting a replacement fee to correspond to a manner of replacement is required.

Furthermore, for partial replacement, a replacement component (a replacement cell) may be a reused secondhand item, and it is necessary to appropriately select which one of the plurality of cells constituting battery 214 is to be removed and what type of cell is to be attached.

Accordingly, in the present embodiment, when battery 214 is partially replaced, or for partial replacement, management server 100 sets a replacement fee of a smaller amount than when battery 214 is entirely replaced, or for entire replacement for the sake of illustration. Furthermore, for partial replacement, management server 100 sets at least a first cell having the smallest full charge capacity among the plurality of cells 214a to 214d as a cell to be replaced and sets a second cell of a plurality of replacement cells (or stocked cells) stored at a prescribed location for replacement as a cell to replace the cell to be replaced. The second cell has a full charge capacity between a maximum value and a minimum value of the full charge capacities of the plurality of cells excluding the first cell. In the present embodiment, management server 100 corresponds to a "replacement fee setting apparatus."

In this way, for partial replacement, the first cell can be replaced with the second cell to substantially increase the range of the amount of power available in battery 214 and hence increase the electric vehicle's travelable distance. Further, for partial replacement, a replacement fee of a smaller amount is set than for entire replacement, which can motivate a user to select the partial replacement. Thus, an appropriate replacement fee for the partial replacement can be set. Furthermore, since the second cell has a full charge capacity between the maximum value and the minimum value of the full charge capacities of the plurality of cells excluding the first cell, the partial replacement can suppress an otherwise increased variation between the full charge capacities of the plurality of cells of battery 214.

<Setting a Replacement Fee>

In the following description, an example of setting a replacement fee when battery 214 mounted in an electric vehicle is partially replaced will be described.

For example, when partial replacement of battery 214 is accepted, management server 100 obtains the full charge capacity of each of the plurality of cells 214a to 214d constituting battery 214. Management server 100 sets at least one of the plurality of cells 214a to 214d having the smallest full charge capacity (or a first cell) as a cell to be replaced. When replacing a plurality of cells, management server 100 sets the cells to be replaced in an ascending order in full charge capacity.

Management server 100 stores the full charge capacity of each of a plurality of stocked cells stored at a prescribed location for replacement, and extracts from the plurality of stocked cells a cell selectable as a replacement cell. For example, management server 100 extracts as a replacement cell, or a second cell, a stocked cell having a full charge capacity between the maximum value and the minimum value of the full charge capacities of the plurality of cells of battery 214 excluding a cell to be replaced. For example, when a plurality of cells are extracted as replacement cells, management server 100 selects as a replacement cell a stocked cell having a full charge capacity higher than an average value of the plurality of cells of battery 214 excluding a cell to be replaced. When there is only one cell to be replaced, management server 100 selects as a replacement cell a cell having the smallest full charge capacity among the plurality of stocked cells extracted. Management server 100 sets a replacement fee based on the selected replacement cell.

<Replacement Fee Setting Process>

Figure 4:
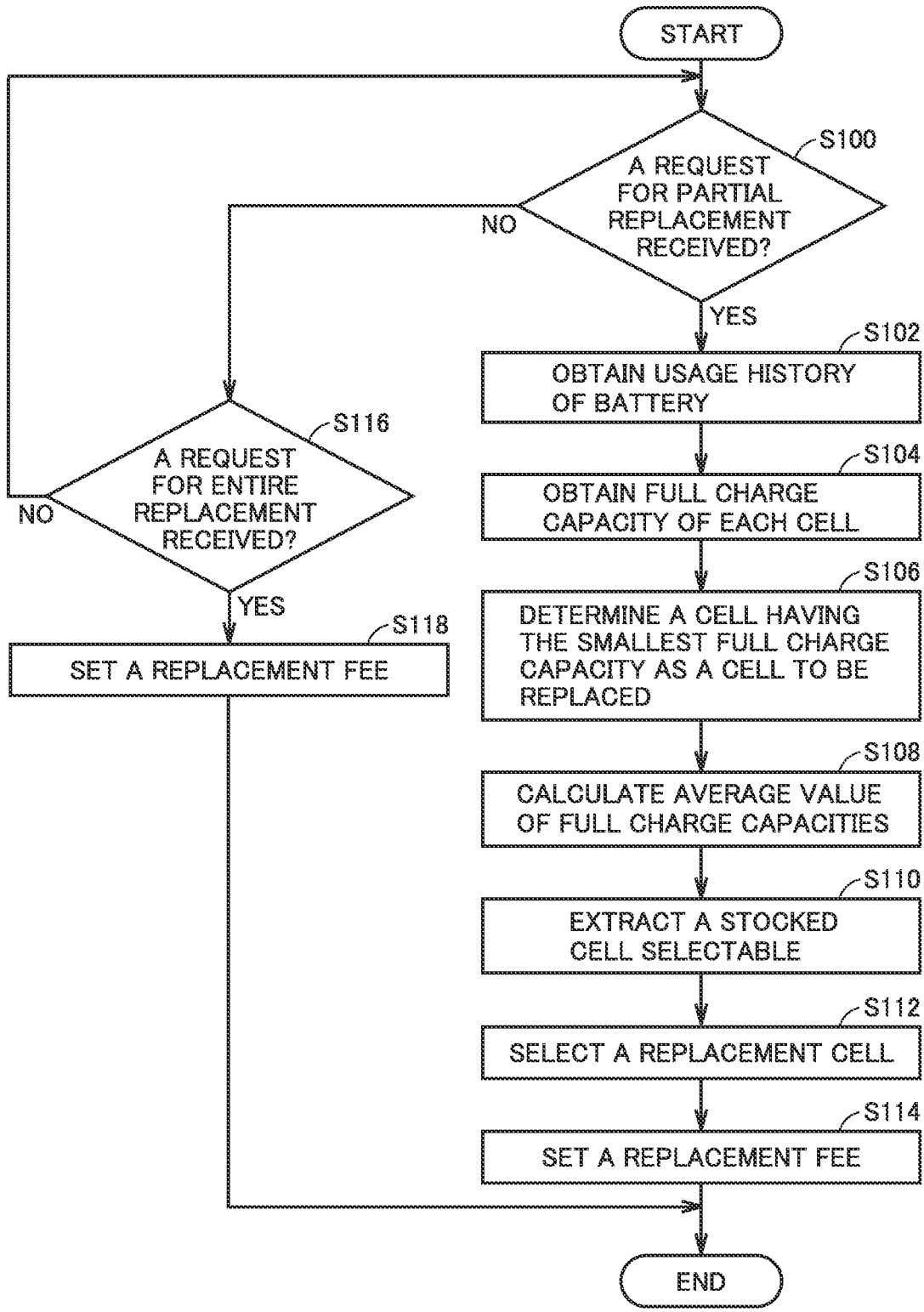
FIG. 4 is a flowchart of a replacement fee setting process.

Hereinafter, a replacement fee setting process will be described in detail with reference to FIG. 4. FIG. 4 is a flowchart of the replacement fee setting process. In the present embodiment, the replacement fee setting process will be described as being executed by management server 100 (more specifically, CPU 102 of management server 100) for the sake of illustration. While each step shown in the flowchart shown in FIG. 4 is implemented by software processing done by management server 100, a part thereof may be implemented by hardware (or electric circuitry) fabricated in management server 100.

In step ("S") 100, management server 100 determines whether a request for partial replacement is received. For example, when management server 100 receives information requesting partial replacement from vehicle 200, management server 100 may determine that a request for partial replacement of battery 214 has been received. Alternatively, when information indicating that partial replacement of battery 214 is requested is input directly to an input device (not shown) of management server 100, management server 100 may determine that a request for partial replacement of battery 214 has been received.

For example, when vehicle 200 moves to a prescribed location for replacement and is communicable with management server 100, and information indicating that partial replacement of battery 214 is requested is input to the input device (not shown) provided inside vehicle 200, vehicle 200 transmits to management server 100 information requesting partial replacement of battery 214.

When it is determined that a request for partial replacement is received (YES in S100), the process proceeds to S102.

In S102, management server 100 obtains a usage history of battery 214 mounted in vehicle 200. Management server 100 for example transmits a request to vehicle 200 to transmit the usage history of battery 214. Upon receiving the request from management server 100, vehicle 200 transmits the usage history of battery 214 stored in storage 206. Management server 100 receives and thus obtains the usage history of battery 214 from vehicle 200.

In S104, management server 100 obtains the full charge capacity of each of cells 214a to 214d from the usage history of battery 214. The full charge capacity may be calculated by management server 100. How the full charge capacity is calculated is as has been described above, and accordingly, will not be described redundantly.

In S106, management server 100 determines as a cell to be replaced a cell (a first cell) of cells 214a to 214d having the smallest one of the full charge capacity of each of cells 214a to 214d.

In S108, management server 100 calculates an average value of the full charge capacities of cells 214a to 214d excluding the first cell.

In S110, management server 100 extracts a stocked cell selectable as a replacement cell from inventory information stored in storage 104. The inventory information includes, for example, information associating information specifying stocked cells with the stocked cells' full charge capacities.

In S112, for example, management server 100 selects as a replacement cell one of the plurality of stocked cells which has a full charge capacity which is larger than the average value of the full charge capacities of cells 214a to 214d excluding the first cell and is smaller than the maximum value of the full charge capacities of cells 214a to 214d excluding the first cell.

In S114, management server 100 sets a replacement fee based on the selected replacement cell. For example, management server 100 sets the replacement fee depending on a ratio of the full charge capacity of the replacement cell to a rated capacity. For example, management server 100 may increase the replacement fee for a replacement cell having a low degree of degradation and having a full charge capacity having a ratio closer to 100% relative to the rated capacity, whereas management server 100 may decrease the replacement fee for a replacement cell having a full charge capacity having a ratio closer to 0% relative to the rated capacity.

If a request for partial replacement has not been received (NO in S100), management server 100 determines in S116 whether a request for entire replacement has been received. When it is determined that a request for entire replacement is received (YES in S116), the process shifts to S118. In S118, management server 100 sets a replacement fee for the entire replacement. The replacement fee for the entire replacement is set to be higher than that for partial replacement (i.e., replacing 1 to 3 cells). On the other hand, if a request for entire replacement has not been received (NO in S116), the process returns to S100.

<Operation of Management Server 100 Serving as Replacement Fee Setting Apparatus>

An operation of management server 100 which is a replacement fee setting apparatus based on the above configuration and flowchart will now be described with reference to FIG. 5. FIG. 5 is a diagram for illustrating an example of an operation performed to determine a cell to be replaced from a plurality of cells. FIG. 5 shows the full charge capacities of cells 214a to 214d. Further, it is assumed that one cell is replaced. For example, as shown in FIG. 5, it is assumed that cells 214a, 214b, 214c, and 214d have full charge capacities C(1), C(2), C(3), and C(4), respectively. Further, as shown in FIG. 5, for example, when the full charge capacities are arranged in descending order, they are arranged as follows: C(3) followed by C(1) followed by C(2) followed by C(4).

When management server 100 receives a request for partial replacement from vehicle 200 (YES in S100), management server 100 obtains a usage history of battery 214 from vehicle 200 (S102). Then, management server 100 obtains the full charge capacity of each of cells 214a to 214d from the obtained usage history of battery 214 (S104). Management server 100 determines as a cell to be replaced cell 214d having the smallest full charge capacity C(4) among cells 214a to 214d (S106).

Management server 100 calculates an average value C(0) of the full charge capacities of cells 214a to 214c excluding cell 214d (S108). Management server 100 extracts from inventory information a plurality of stocked cells having a full charge capacity larger than C(0) (S110).

From the plurality of stocked cells extracted, management server 100 selects as a replacement cell a stocked cell which has a full charge capacity C(5) which is larger than C(0) and smaller than the maximum value C(3) among cells 214a to 214c (S112), and management server 100 sets a replacement fee corresponding to the full charge capacity of the replacement cell selected (S114). When management server 100 receives a request for entire replacement (YES in S116), management server 100 sets a replacement fee of a larger amount than for partial replacement (S118). Further, management server 100 may notify the user's mobile terminal and vehicle 200 of the set replacement fee.

<Function and Effect of Replacement Fee Setting Apparatus>

Thus, according to the replacement fee setting apparatus of the present embodiment, for partial replacement, cell 214d can be replaced with a replacement cell to substantially increase the range of the amount of power available in battery 214 and hence increase the electric vehicle's travelable distance. Further, for partial replacement, a replacement fee of a smaller amount is set than for entire replacement, which can motivate a user to select the partial replacement. Accordingly, an appropriate replacement fee for the partial replacement can be set. Furthermore, the replacement cell has a full charge capacity between the maximum value and the minimum value of the full charge capacities of a plurality of cells excluding a cell to be replaced, and partial replacement can suppress an otherwise increased variation between the full charge capacities of the plurality of cells of battery 214. Thus there can be provided a replacement fee setting apparatus, method and system such that when a power storage device having a divided configuration is partially replaced an appropriate replacement target is selected and an appropriate replacement fee is set.

Furthermore, for a replacement cell having a smaller full charge capacity, a replacement fee of a smaller amount is set than for a replacement cell having a larger full charge capacity, which can motivate a user to select the replacement cell having the smaller full charge capacity. Accordingly, an appropriate replacement fee for partial replacement can be set.

Modifications

While the above embodiment has been described to set a replacement fee of a smaller amount for partial replacement than entire replacement, for example for partial replacement, a returning rate larger than for entire replacement may be set and applied to provide a rebate by cash, a voucher or a variety of types of points to set a replacement fee to be a substantially small amount.

Further, while the above embodiment has been described to set a replacement fee of a smaller amount for partial replacement than entire replacement, for example a partial-replacement fee paid to replace one cell may be set to be a smaller amount than an entire-replacement fee divided by the number of cells (or four), that is, a fee per sell.

Furthermore, while the above embodiment has been described to set a replacement fee of a smaller amount for a replacement cell having a smaller full charge capacity than a replacement cell having a larger full charge capacity, for example a larger returning rate may be set for a replacement cell having a smaller full charge capacity than a replacement cell having a larger full charge capacity, or a replacement fee of a larger amount may be set for a replacement cell having a larger full charge capacity than a replacement cell having a smaller full charge capacity.

Furthermore, while the above embodiment has been described with management server 100 selecting a replacement cell from stocked cell extracted, for example when a plurality of stocked cells are extracted a user may select a cell therefrom as a replacement cell. For example, management server 100 may notify the user's mobile terminal of the full charge capacity of each of the plurality of stocked cells extracted, and the user may transmit to management server 100 information indicating that the user selects one of the plurality of stocked cells extracted.

Furthermore, while the above embodiment has been described such that a stocked cell which has a full charge capacity larger than an average value of cells 214a to 214c excluding cell 214d is selected as a replacement cell, at least having a full charge capacity between the maximum value and the minimum value of the full charge capacities of cells 214a to 214c suffices, and selecting a stocked cell having a full charge capacity larger than the average value is not exclusive. For example, a stocked cell having a full charge capacity which is larger than the minimum value among the plurality of cells of battery 214 excluding a cell to be replaced and is smaller than the average value may be selected as a replacement cell.

Furthermore, while the above embodiment has been described such that, of the plurality of cells 214a to 214d constituting battery 214, a cell having the smallest full charge capacity is set as a cell to be replaced, in addition to the cell having the smallest full charge capacity a cell having the largest full charge capacity may be a cell to be replaced. This can reduce a variation of the full charge capacity of each cell of battery 214 after replacement. Uniforming full charge capacities can align degrees of degradation between the plurality of cells constituting battery 214, and also allows the cell having the largest full charge capacity to be reused and can thus provide ample inventory.

Furthermore, while the above embodiment has been described with battery 214 replaceable cell by cell, for example it may be replaceable module by module each including a plurality of cells.

It should be noted that the above modifications may be implemented all together or may partially be implemented in combination.

Although the present disclosure has been described and illustrated in detail, it is clearly understood that the same is by way of illustration and example only and is not to be taken by way of limitation, the scope of the present disclosure being interpreted by the terms of the appended claims.

What is claimed is:

1. A replacement fee setting apparatus for an electric vehicle having a power storage device mounted therein, the power storage device including a plurality of replaceable power storage elements, comprising:
    a storage device configured to store information of a full charge capacity of each of the plurality of the replaceable power storage elements and information of a full charge capacity of each of a plurality of stocked replacement power storage elements; and
    a processor configured to set a lower replacement fee for partial replacement of the power storage device of the electric vehicle than for entire replacement, in the partial replacement a portion of the power storage device including at least one of the plurality of the replaceable power storage elements being replaced, in the entire replacement the power storage device being replaced entirely;
    the processor configured to obtain a voltage, a current, and a temperature of each of the plurality of the replaceable power storage elements, the voltage being detected by a voltage sensor provided with each of the plurality of the replaceable power storage elements, the current being detected by a current sensor provided with each of the plurality of the replaceable power storage elements, and the temperature being detected by a temperature sensor provided with each of the plurality of the replaceable power storage elements
    wherein a motor generator of the electric vehicle is configured to move the electric vehicle to a prescribed location for the partial replacement when the processor receives a request for the partial replacement of the power storage device, and
    wherein the processor is further configured to
        obtain an usage history of the power storage device from the electric vehicle;
        determine, for the partial replacement, at least a first power storage element of the plurality of the replaceable power storage elements as a power storage element to be replaced based on the obtained usage history of the power storage device from the electric vehicle, the first power storage element having the smallest full charge capacity among the plurality of the replaceable power storage elements;
        determine an average capacity value of the full charge capacities of the plurality of the replaceable power storage elements excluding the first power storage element;
        set a second power storage element of the plurality of stocked replacement power storage elements as a target power storage element to replace the first power storage element, the second power storage element having a full charge capacity greater than the average capacity value and less than a maximum capacity value among the full charge capacities of the plurality of the replaceable power storage elements excluding the first power storage element so as to suppress variation between the full charge capacities of the plurality of the replaceable power storage elements based on the partial replacement; and
        set the replacement fee depending on a ratio of the full charge capacity of the second power storage element to a rated capacity of the second power storage element.

2. The replacement fee setting apparatus according to claim 1, wherein the processor is configured to set a lower replacement fee when the second power storage element has a smaller full charge capacity than when the second power storage element has a larger full charge capacity.

3. A method for setting a replacement fee for a power storage device mounted in an electric vehicle, the power storage device including a plurality of replaceable power storage elements, the method comprising:
    storing information of a full charge capacity of each of the plurality of the replaceable power storage elements and information of a full charge capacity of each of a plurality of stocked replacement power storage elements;
    setting a lower replacement fee, by a processor, for partial replacement of the power storage device of the electric vehicle than for entire replacement, in the partial replacement a portion of the power storage device including at least one of the plurality of the replaceable power storage elements being replaced, in the entire replacement the power storage device being replaced entirely;
    obtaining, by the processor, a voltage, a current, and a temperature of each of the plurality of the replaceable power storage elements, the voltage being detected by a voltage sensor provided with each of the plurality of the replaceable power storage elements, the current being detected by a current sensor provided with each of the plurality of the replaceable power storage elements, and the temperature being detected by a temperature sensor provided with each of the plurality of the replaceable power storage elements;
    moving the electric vehicle, by a motor generator, to a prescribed location for the partial replacement when the processor receives a request for the partial replacement of the power storage device, and
    the method further comprising
        obtaining an usage history of the power storage device from the electric vehicle;
        determining, for the partial replacement, a first power storage element of the plurality of the replaceable power storage elements as a power storage element to be replaced based on the obtained usage history of the power storage device from the electric vehicle, the first power storage element having the smallest full charge capacity among the plurality of the replaceable power storage elements;
        determining an average capacity value of the full charge capacities of the plurality of the replaceable power storage elements excluding the first power storage element;
        setting a second power storage element of the plurality of stocked replacement power storage elements as a target power storage element to replace the first power storage element, the second power storage element having a full charge capacity greater than the average capacity value and less than a maximum capacity value among the full charge capacities of the plurality of the replaceable power storage elements excluding the first power storage element so as to suppress variation between the full charge capacities of the plurality of the replaceable power storage elements based on the partial replacement; and setting the replacement fee depending on a ratio of the full charge capacity of the replacement cell second power storage element to a rated capacity of the second power storage element.

4. A replacement fee setting system comprising:

an electric vehicle having a power storage device mounted therein, the power storage device including a plurality of replaceable power storage elements; and a server configured to set a replacement fee for the power storage device, wherein the server including:

a storage device configured to store information of a full charge capacity of each of a plurality of stocked replacement power storage elements and information of a full charge capacity of each of the plurality of the replaceable power storage elements as obtained from the electric vehicle; and a processor configured to set a lower replacement fee for partial replacement of the power storage device of the electric vehicle than for entire replacement, in the partial replacement a portion of the power storage device including at least one of the plurality of the replaceable power storage elements being replaced, in the entire replacement the power storage device being replaced entirely, the processor configured to obtain a voltage, a current, and a temperature of each of the plurality of the replaceable power storage elements, the voltage being detected by a voltage sensor provided with each of the plurality of the replaceable power storage elements, the current being detected by a current sensor provided with each of the plurality of the replaceable power storage elements, and the temperature being detected by a temperature sensor provided with each of the plurality of the replaceable power storage elements;

wherein a motor generator of the electric vehicle is configured to move the electric vehicle to a prescribed location for the partial replacement when the processor receives a request for the partial replacement of the power storage device, and wherein the processor is further configured to obtain an usage history of the power storage device from the electric vehicle;

determine, for the partial replacement, a first power storage element of the plurality of the replaceable power storage elements as a power storage element to be replaced based on the obtained usage history of the power storage device from the electric vehicle, the first power storage element having the smallest full charge capacity among the plurality of the replaceable power storage elements;

determine an average capacity value of the full charge capacities of the plurality of the replaceable power storage elements excluding the first power storage element;

set a second power storage element of the plurality of stocked replacement power storage elements as a target power storage element to replace the first power storage element, the second power storage element having a full charge capacity greater than the average capacity value and less than a maximum capacity value among the full charge capacities of the plurality of the replaceable power storage elements excluding the first power storage element so as to suppress variation between the full charge capacities of the plurality of the replaceable power storage elements based on the partial replacement; and set the replacement fee depending on a ratio of the full charge capacity of the second power storage element to a rated capacity of the second power storage element.

\* \* \* \* \*